(12) United States Patent
Stares et al.

(10) Patent No.: US 9,193,262 B2
(45) Date of Patent: Nov. 24, 2015

(54) VEHICLE AND METHOD OF CONTROLLING A VEHICLE

(75) Inventors: Pete Stares, Whitley (GB); Ian Beverley, Whitley (GB); Shaun Wick, Solihall (GB); Russell Percy Osborn, Warwick (GB); Paul Beever, Rugby (GB)

(73) Assignee: Jaguar Land Rover Limited, Whitley, Coventry, Warwickshire (GB)

(*) Notice: Subject to any disclaimer, the term of this patent is extended or adjusted under 35 U.S.C. 154(b) by 214 days.

(21) Appl. No.: 14/000,389
(22) PCT Filed: Feb. 20, 2012
(86) PCT No.: PCT/EP2012/052849
§ 371 (c)(1),
(2), (4) Date: Oct. 28, 2013
(87) PCT Pub. No.: WO2012/110657
PCT Pub. Date: Aug. 23, 2012
(65) Prior Publication Data
US 2014/0067216 A1 Mar. 6, 2014

(30) Foreign Application Priority Data

Feb. 18, 2011 (GB) .................................. 1102822.2

(51) Int. Cl.
*G06F 7/00* (2006.01)
*B60K 23/08* (2006.01)
(Continued)

(52) U.S. Cl.
CPC ................. *B60K 23/08* (2013.01); *B60K 17/34* (2013.01); *B60K 17/35* (2013.01); *B60K 23/0808* (2013.01); *B60K 2023/0858* (2013.01); *B60W 10/02* (2013.01); *B60W 2510/0291* (2013.01)

(58) Field of Classification Search
None
See application file for complete search history.

(56) References Cited

U.S. PATENT DOCUMENTS

| | | | |
|---|---|---|---|
| 4,681,185 | A | 7/1987 | Hoernig et al. |
| 6,275,762 | B1 | 8/2001 | Salg |

(Continued)

FOREIGN PATENT DOCUMENTS

| | | |
|---|---|---|
| EP | 1188596 A2 | 3/2002 |
| GB | 2136748 A | 9/1984 |

(Continued)

OTHER PUBLICATIONS

Great Britain Combined Search and Examination Report for corresponding application No. 1102822.2, dated Jun. 10, 2011, 8 pages.

(Continued)

*Primary Examiner* — Adam Alharbi
(74) *Attorney, Agent, or Firm* — Reising Ethington P.C.

(57) ABSTRACT

Embodiments of the present invention provide a motor vehicle having: prime mover means; at least first and second groups of one or more wheels; and a driveline operable to connect the prime mover means to the first and second groups of one or more wheels such that the first group of one or more wheels and not the second group is coupled to a torque transmission path from the prime mover means when the driveline is in a first mode of operation and both the first and second groups of one or more wheels are coupled to a torque transmission path from the prime mover means when the driveline is in a second mode of operation, the driveline including an auxiliary portion for connecting the second group to the torque transmission path from the prime mover means, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels, the vehicle further comprising control means operable to control the first and second torque transmitting means to switch the driveline between the first and second modes of operation such that in the first mode the prop shaft is disconnected from both the torque transmission path from the prime mover means and said second group of one or more wheels, wherein when in the first mode the vehicle is operable to control the driveline to switch from first mode to the second mode responsive to a speed of the vehicle.

18 Claims, 3 Drawing Sheets

(51) Int. Cl.
  *B60K 17/34* (2006.01)
  *B60K 17/35* (2006.01)
  *B60W 10/02* (2006.01)

(56) References Cited

U.S. PATENT DOCUMENTS

| | | | |
|---|---|---|---|
| 2005/0209760 A1* | 9/2005 | Tabata et al. | 701/53 |
| 2006/0231314 A1 | 10/2006 | Homan et al. | |
| 2009/0037061 A1* | 2/2009 | Tabata et al. | 701/55 |
| 2009/0082154 A1* | 3/2009 | Iwase et al. | 475/150 |
| 2009/0250283 A1 | 10/2009 | Ghoneim et al. | |

FOREIGN PATENT DOCUMENTS

| | | |
|---|---|---|
| GB | 2407804 A | 5/2005 |
| JP | S6141035 U | 3/1986 |
| JP | H10272955 A | 10/1998 |
| JP | 2000326742 A | 11/2000 |
| JP | 2004322702 A | 11/2004 |
| JP | 2009166706 A | 7/2009 |
| WO | WO2006128537 A1 | 12/2006 |

OTHER PUBLICATIONS

English-language Summary of Japanese Office Action corresponding to Japanese Patent Application No. 2013-553958, dated Jul. 30, 2014, 3 pages.
International Search Report for PCT/EP2012/052849 dated Oct. 7, 2012, 4 pages.
English Translation of Japanese Reasons for Refusal corresponding to Application No. 2013-553958, dated Jul. 28, 2015.

* cited by examiner

VEHICLE AND METHOD OF CONTROLLING A VEHICLE

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable change the number of wheels that provide torque to drive the vehicle.

BACKGROUND

It is known to provide a motor vehicle having a four wheel drive mode of operation in which motive power is supplied to each of two pairs of wheels of the vehicle. Motive power is supplied to the wheels by means of a driveline.

Some known vehicles are arranged such that motive power is permanently supplied to both pairs of wheels. Some other vehicles are arranged such that motive power is selectively supplied to either only one pair or to both pairs of wheels. A driver operable selector may be provided to allow the driver to select two wheel or four wheel operation. Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of two of the wheels to the driveline following disconnection of the wheels from the driveline may be undertaken when the vehicle is moving. Such a system may be referred to as a dynamic driveline reconnect system. The system disclosed in GB2407804 employs clutch arrangements to enable dynamic driveline reconnection.

It is an aim of embodiments of the present invention to at least partially mitigate the disadvantages of known dynamic driveline systems.

STATEMENT OF THE INVENTION

Embodiments of the invention may be understood by reference to the appended claims.

Aspects of the invention provide a motor vehicle and a method.

In a further aspect of the invention for which protection is sought there is provided a motor vehicle having:
  prime mover means;
  at least first and second groups of one or more wheels; and
  a driveline operable to connect the prime mover means to the first and second groups of one or more wheels such that the first group of one or more wheels and not the second group is coupled to a torque transmission path from the prime mover means when the driveline is in a first mode of operation and both the first and second groups of one or more wheels are coupled to a torque transmission path from the prime mover means when the driveline is in a second mode of operation,
  the driveline including an auxiliary portion for connecting the second group to the torque transmission path from the prime mover means, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels,
  the vehicle further comprising control means operable to control the first and second torque transmitting means to switch the driveline between the first and second modes of operation such that in the first mode the prop shaft is disconnected from both the torque transmission path from the prime mover means and said second group of one or more wheels,
  wherein when in the first mode the vehicle is operable to control the driveline to switch from first mode to the second mode responsive to a speed of the vehicle.

It is to be understood that when the prop shaft is disconnected from both the torque transmission path from the prime mover means and said second group of one or more wheels the prop shaft may be substantially stationary even when the vehicle is moving.

It is to be understood that reference herein to a group of one or more wheels includes reference to a group having a membership of only one wheel.

It is to be understood that a gearbox, transmission or other component may be provided in the torque transmission path from the prime mover means to the auxiliary portion of the driveline. It is to be understood that the gearbox or transmission may be operable to disconnect the prime mover means from the first and second groups of wheels with the driveline in the first or second mode, the selected mode of the driveline being determined by the state of the first and second releasable torque transmitting means. That is, regardless of whether or not the transmission is in a state in which torque may be transferred therethrough to the first or second groups of wheels, the driveline mode is determined by reference to the state of the first and second releasable torque transmitting means.

In an embodiment the control means is operable to control the driveline to assume the second mode when the speed is less than or equal to a first prescribed threshold speed value.

In an embodiment the control means is operable to control the driveline to assume the second mode when the vehicle is substantially stationary.

In an embodiment the control means is configured to control the vehicle to assume the second mode when the vehicle is substantially stationary and the vehicle is in a shutdown condition.

In an embodiment the prime mover means comprises an engine and the shutdown condition corresponds to a condition in which the engine is turned off.

In an embodiment the vehicle is provided with an automatic transmission having a 'park' mode and a 'neutral' mode, the vehicle being arranged to control the driveline to assume the second mode when the transmission is in one selected from amongst the 'park' mode and the 'neutral' mode.

In an embodiment the first prescribed threshold speed value is non-zero.

This feature has the advantage that a risk that the vehicle stops with the driveline in a configuration in which the second mode cannot be assumed is reduced. Such a configuration can arise for example due to a tooth-on-tooth condition of the releasable torque transmitting means. However, by assuming the second mode whilst the vehicle is still moving, a risk that the first and/or second releasable torque transmitting means cannot connect the prop shaft to the prime mover means and/or second group of one or more wheels due to a tooth-on-tooth or like condition is reduced.

In an embodiment the first prescribed threshold speed value is in the range of at least one selected from amongst from 1 to 50, 1 to 40, 1 to 30, 1 to 20, 1 to 15, 1 to 10, 1 to 5, 5 to 10 and 5 to 15 kilometers per hour.

In an embodiment the control means is configured to control the driveline to assume the first mode when the speed rises above the first prescribed threshold speed value from a value below the first prescribed threshold speed value.

In an embodiment the control means is configured to control the driveline to assume the first mode when the speed rises above a second prescribed threshold speed value greater than the first prescribed threshold speed value from a value below the second prescribed threshold speed value.

This has the advantage that 'hysteresis' may be introduced in respect of the speed threshold at which transitions between the first and second modes take place. This has the advantage that a risk of mode chattering may be reduced.

By mode chattering is meant that the vehicle transitions between the first and second modes repeatedly within a relatively short period of time. For example if a vehicle is arranged to transition from the first mode to the second mode when speed falls below the first prescribed value but to transition back to the first mode when the speed rises above the same prescribed value mode chattering can occur if the vehicle speed fluctuates about the prescribed value. The speed may fluctuate about the prescribed value due to traffic conditions, or where a driver is seeking to maintain a speed that is similar to the prescribed value.

In an embodiment the first prescribed threshold speed value is substantially equal to or less than 15 kilometers per hour and the second prescribed threshold is greater than 15 kilometers per hour.

In an embodiment the control means is operable to control the driveline to assume the second mode when the speed rises above a third prescribed threshold speed value from a value below the third prescribed threshold speed value.

In an embodiment the third threshold speed value is greater than the first threshold speed value.

In an embodiment the third threshold speed value is greater than the second threshold speed value.

In an embodiment the control means is operable to control the driveline to assume the first mode when the speed falls below a fourth prescribed threshold speed value from a value above the fourth prescribed threshold speed value, the fourth prescribed threshold speed value being greater than the second prescribed threshold speed value and less than the third prescribed threshold speed value.

In an embodiment when the control means controls the driveline to assume the second mode responsive to a speed of the vehicle the control means is operable to control the driveline to complete the transition to the second mode within a period of time the length of which is responsive to a rate of deceleration of the vehicle.

This feature has the advantage that when a driver applies brakes of the vehicle relatively harshly so as to increase a rate of deceleration of the vehicle the driveline is arranged more quickly to assume the second mode thereby ensuring that the second mode is assumed before the vehicle stops. This reduces a risk that the driveline will be unable to assume the second mode correctly, for example due to a tooth on tooth condition of the one or more clutches of the driveline.

Furthermore assuming the second mode more quickly has the advantage that improved handling of the vehicle may be enjoyed more quickly as the vehicle decelerates.

A transition to fully assume the second mode typically requires movement of one or more actuators. In order to complete the transition more quickly the vehicle may be configured to control the actuators to move more quickly than in a case where the transition is to be accomplished less quickly.

In an embodiment when the control means controls the driveline to assume the second mode responsive to a speed of the vehicle the vehicle is configured to control the driveline to complete a transition to the second mode within a period of time the length of which decreases as a function of increasing rate of deceleration.

Controlling the driveline to assume the second mode within a shorter time period (at a higher rate) has the advantage that the second mode is assumed more quickly when the vehicle decelerates. This has the advantage that improved vehicle handling may be enjoyed as the vehicle decelerates because the second mode is assumed more quickly the greater the rate of deceleration. In addition a risk that the vehicle stops before the driveline has assumed the second mode is also reduced.

In an embodiment the control means is configured to increase the first threshold speed value as a function of increasing rate of deceleration.

In an embodiment the first group of wheels comprises a first pair of wheels and the first mode corresponds to a two wheel drive mode of operation wherein the first pair of wheels is driven by the engine.

In an embodiment the second group of wheels comprises a second pair of wheels and the second mode of operation corresponds to a four wheel drive mode of operation.

Alternatively the second group of wheels comprises a first, a second and a third pair of wheels and the second mode of operation corresponds to a six wheel drive mode of operation.

Optionally at least one of the first and second groups of wheels comprises a plurality of pairs of wheels.

In an embodiment the prime mover means comprises at least one selected from amongst an internal combustion engine and an electric machine.

In one aspect of the invention for which protection is sought there is provided a method of controlling a motor vehicle, comprising, providing a motor vehicle having a driveline operable to connect prime mover means of the vehicle to first and second groups of one or more wheels such that the first group of one or more wheels and not the second group is coupled to a torque transmission path from the prime mover means when the driveline is in a first mode of operation and both the first and second groups of one or more wheels are coupled to a torque transmission path from the prime mover means when the driveline is in a second mode of operation, the driveline including an auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels, the method comprising controlling the first and second torque transmitting means to switch the driveline between the first and second modes of operation whereby in the first mode the prop shaft is disconnected from both the torque transmission path from the prime mover means and said second group of one or more wheels and in the second mode the prop shaft is connected to both the torque transmission path from the prime mover means and said second group of one or more wheels, the method comprising controlling the driveline to switch from the first mode to the second mode responsive to a speed of the vehicle.

In an aspect of the invention for which protection is sought there is provided a motor vehicle having: a prime mover; at least first and second groups of one or more wheels; and a driveline to connect the prime mover to the first and second groups of one or more wheels such that the first group of one or more wheels is driven by the prime mover when the driveline is in a first mode of operation and the second group of one or more wheels is additionally driven by the prime mover when the driveline is in a second mode of operation, the driveline including an auxiliary driveline comprising releasable torque transmitting means operable to connect the second group of one or more wheels to the prime when the driveline transitions between the first mode and the second mode, wherein when in the first mode the vehicle is operable to control the driveline to assume the second mode responsive to a speed of the vehicle.

In a further aspect of the invention for which protection is sought there is provided a method of controlling a motor vehicle to transition between first and second modes of operation, in the first mode of operation a prime mover of the vehicle being arranged to drive a first group of one or more wheels and in the second mode of operation the prime mover being arranged to drive the first group of one or more wheels and in addition a second group of one or more wheels, the method comprising the step of controlling the driveline to assume the second mode of operation responsive to a speed of the vehicle.

The method may comprise the step of controlling the driveline to assume the second mode when the speed is equal to or less than a first prescribed threshold speed value.

The method may comprise controlling the driveline to assume the second mode when the vehicle is substantially stationary.

The method may comprise controlling the driveline to assume the second mode when the vehicle is substantially stationary and the vehicle is in a shutdown mode.

The method may comprise the step of controlling the vehicle to assume the second mode when the vehicle is stationary and the engine is turned off.

The method may comprise the step of controlling the vehicle to assume the second mode when the vehicle is stationary and a transmission of the vehicle is in one selected from amongst a 'park' mode and a 'neutral' mode.

Alternatively the method may comprise the step of controlling the driveline to assume the second mode when the speed of the vehicle is equal to or less than a nonzero first prescribed threshold speed value.

This feature has the advantage that a risk that the vehicle stops with the driveline in a configuration in which the second mode cannot be assumed is reduced. Such a configuration can arise for example due to a tooth-on-tooth condition of the releasable torque transmitting means.

The method may comprise the step of controlling the vehicle to assume the second mode when the speed of the vehicle is in the range of at least one selected from amongst from 1 to 50, 1 to 40, 1 to 30, 1 to 20, 1 to 15, 1 to 10, 1 to 5, 5 to 10 and 5 to 15 kilometers per hour.

The method may comprise the step of controlling the vehicle to assume the first mode when the speed exceeds the first prescribed threshold speed value.

Alternatively the method may comprise the step of controlling the vehicle to assume the second mode when the speed exceeds a second prescribed threshold value greater than the first prescribed threshold value.

The first prescribed threshold speed value may be substantially equal to or less than 15 kilometers per hour and the second prescribed threshold may be greater than 15 kilometers per hour.

When in the first mode the method may comprise controlling the driveline to assume the second mode at a rate responsive to a rate of deceleration of the vehicle.

The method may comprise controlling the driveline to assume the second mode at a rate that increases as a function of increasing rate of deceleration.

The method may comprise controlling the driveline to assume the second mode at a vehicle speed that increases as a function of increasing rate of deceleration.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described with reference to the accompanying figures in which.

DETAILED DESCRIPTION

Figure 1:
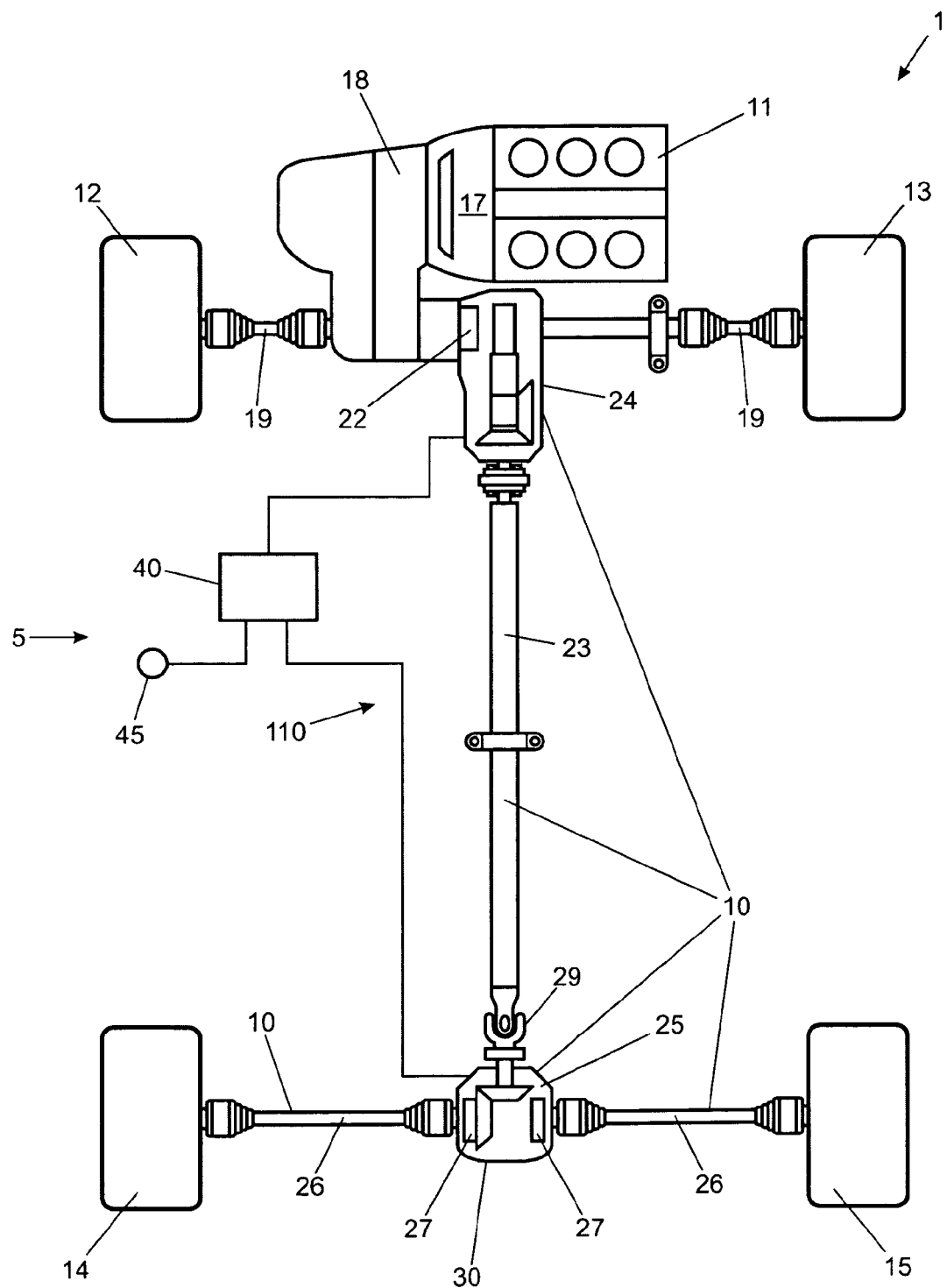
FIG. 1 is a schematic illustration of a vehicle according to an embodiment of the present invention.

FIG. 1 shows a driveline 5 of a motor vehicle 1 according to an embodiment of the present invention. The driveline 5 is connected to an internal combustion engine 11 by means of a gear box 18 and has a pair of front wheels 12, 13, an auxiliary portion 10 and a pair of rear wheels 14, 15.

The driveline 5 is arranged selectively to transmit power supplied to it by the gearbox 18 from the internal combustion engine 11 to the front wheels 12, 13 only (in a first mode of operation also referred to as a two wheel drive mode of operation) or to the front wheels 12, 13 and the rear wheels 14, 15 simultaneously (in a second mode of operation also referred to as a four wheel drive mode of operation).

Power is transmitted by the driveline 5 from the internal combustion engine 11 to the front wheels 12, 13 by means of a clutch 17, a gearbox 18 and a pair of front drive shafts 19.

Power is transmitted to the rear wheels 14, 15 by means of the auxiliary portion 10 of the driveline 5. The auxiliary portion 10 has a power transfer unit (PTU) 24 having a power transfer clutch (PTC) 22 operable to connect a main drive shaft (or prop shaft) 23 of the auxiliary portion 10 to the gearbox 18. The prop shaft 23 is coupled in turn to a rear differential 30 operable to couple the prop shaft 23 to the rear drive shafts 26.

The rear differential 30 has a pair of clutches 27 by means of which the rear differential 30 is operable to connect the prop shaft 23 to the rear drive shafts 26 when the four wheel drive mode of operation is required.

The driveline 5 has a controller 40 arranged to control operation of the PTU 24 and clutches 27. When a four wheel drive mode of operation is required the controller 40 is arranged to close the PTC 22 and to close clutches 27 of the differential 30.

In the embodiment of FIG. 1 the driveline 5 is configured to transition from a two wheel drive mode to a four wheel drive mode in which the PTC 22 and the differential clutches 27 are closed according to the state $S_{ds}$ of a control input 45. The control input may be provided by a driver operated switch or other control input. However the control input 45 switch may be over-ridden by the controller 40 under certain circumstances. Thus the actual state $S_a$ of the driveline 5 may differ from the state $S_{ds}$. State '$S_a=0$' corresponds to the first mode of operation and state '$S_a=1$' corresponds to the second mode of operation.

In some embodiments no control input 45 is provided for selecting two wheel drive or four wheel drive operation. Rather, the vehicle is operable to switch between the two wheel drive and four wheel drive modes according to control signals generated substantially exclusively by the controller 40.

In the present embodiment the driveline 5 is configured automatically to assume the four wheel drive mode of operation whenever a speed v of the vehicle falls below a threshold value $v_1$. When the speed rises above $v_1$ the driveline assumes automatically the two wheel drive mode unless the control input 45 is set to request the four wheel drive mode or other conditions exist requiring the four wheel drive mode to remain engaged.

For example, certain vehicle programs such as a "snow/ice" terrain response program executed by the controller 40 (or other vehicle controller) may require the driveline 5 to remain in the four wheel drive mode regardless of the speed of the vehicle 1.

Figure 2:
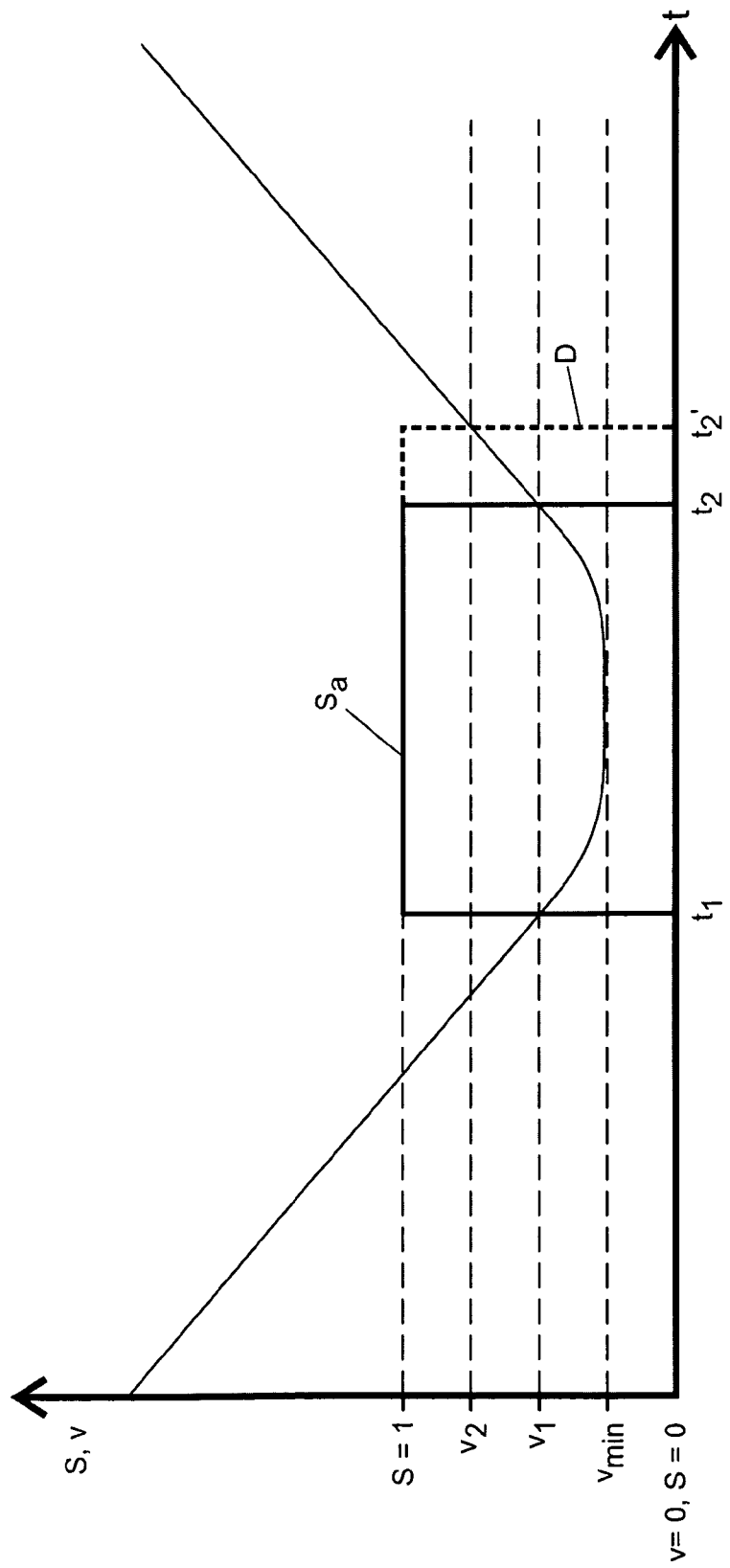
FIG. 2 is a plot of vehicle speed and driveline mode as a function of time for a portion of a drivecycle for a vehicle according to an embodiment of the invention.

Operation of the driveline 5 of the embodiment of FIG. 1 is illustrated by the plots of FIG. 2. The plots show an actual state $S_a$ of the driveline 5 as a function of time t as a speed v of the vehicle falls from a speed above a first threshold speed $v_1$ to a speed below $v_1$ and then rises back to a speed above $v_1$. Throughout the period shown the state of the driveline requested by the control input was a selected state $S_{ds}=0$.

When the speed is above $v_1$ the state $S_a$ of the driveline 5 is set to zero corresponding to the two wheel drive mode of operation unless the controller 40 requires otherwise as discussed above. When the speed v of the vehicle falls below $v_1$ at time $t_1$ the controller 40 controls the driveline 5 automatically to assume the four wheel drive mode of operation ($S_a=1$). At time $t_2$ the speed of the vehicle rises above $v_1$ and the controller controls the driveline 5 automatically to resume the two wheel drive mode of operation.

In one alternative embodiment of the invention the controller 40 is configured to control the driveline 5 automatically to assume the two wheel drive mode from the four wheel drive mode when the speed rises above a second threshold value $v_2$ greater than the first threshold value $v_1$ and not when the speed rises above $v_1$ only.

Operation of a vehicle according to such an embodiment is also illustrated in FIG. 2. It can be seen that the vehicle speed exceeds $v_2$ after time $t_2'$ and the dashed line D shows the transition from four wheel drive to two wheel drive mode when the vehicle speed v exceeds $v_2$ and not when the vehicle speed exceeds $v_1$.

It is to be understood that the employment of two different speed threshold values to control switching of the driveline between modes has the advantage that a risk of mode chattering may be reduced.

It is to be understood that a risk of mode chattering is greater when a single speed threshold value is employed because if the vehicle speed fluctuates about $v_1$ rapid switching between the first and second modes may occur. In contrast in embodiments employing two different speed thresholds, if the speed fluctuates about $v_1$ but does not exceed $v_2$, once the driveline has assumed the second mode it will remain in the second mode until the speed exceeds $v_2$.

In some embodiments of the invention $v_1$ is around 10 kilometers per hour and $v_2$ is around 25 kilometers per hour. Other speeds are also useful.

In some embodiments the driveline 5 is operable to assume the second mode of operation when the vehicle speed v exceeds a third speed threshold $v_3$ that is greater than $v_2$. It is to be understood that in some drivelines 5 a transition from the first mode to the second mode of operation cannot be performed above a certain speed due to system limitations. Thus if whilst driving above this speed in the first mode, a transition to the second mode is desirable in order to improve one or more vehicle performance characteristics (such as a braking, cornering or other characteristic), such a transition is not possible.

Accordingly, in order to mitigate this problem the driveline 5 is configured automatically to assume the second mode when the speed exceeds a threshold speed $v_3$ which is at or below the maximum speed at which the driveline 5 may transition to the second mode. In some embodiments the driveline 5 is arranged automatically to resume operation in the first mode when the speed falls below threshold speed $v_4$ which is less than $v_3$ but greater than $v_2$. By way of example, $v_3$ could be (say) 150 km/h and $v_4$ could be (say) 120 km/h.

Figure 3:
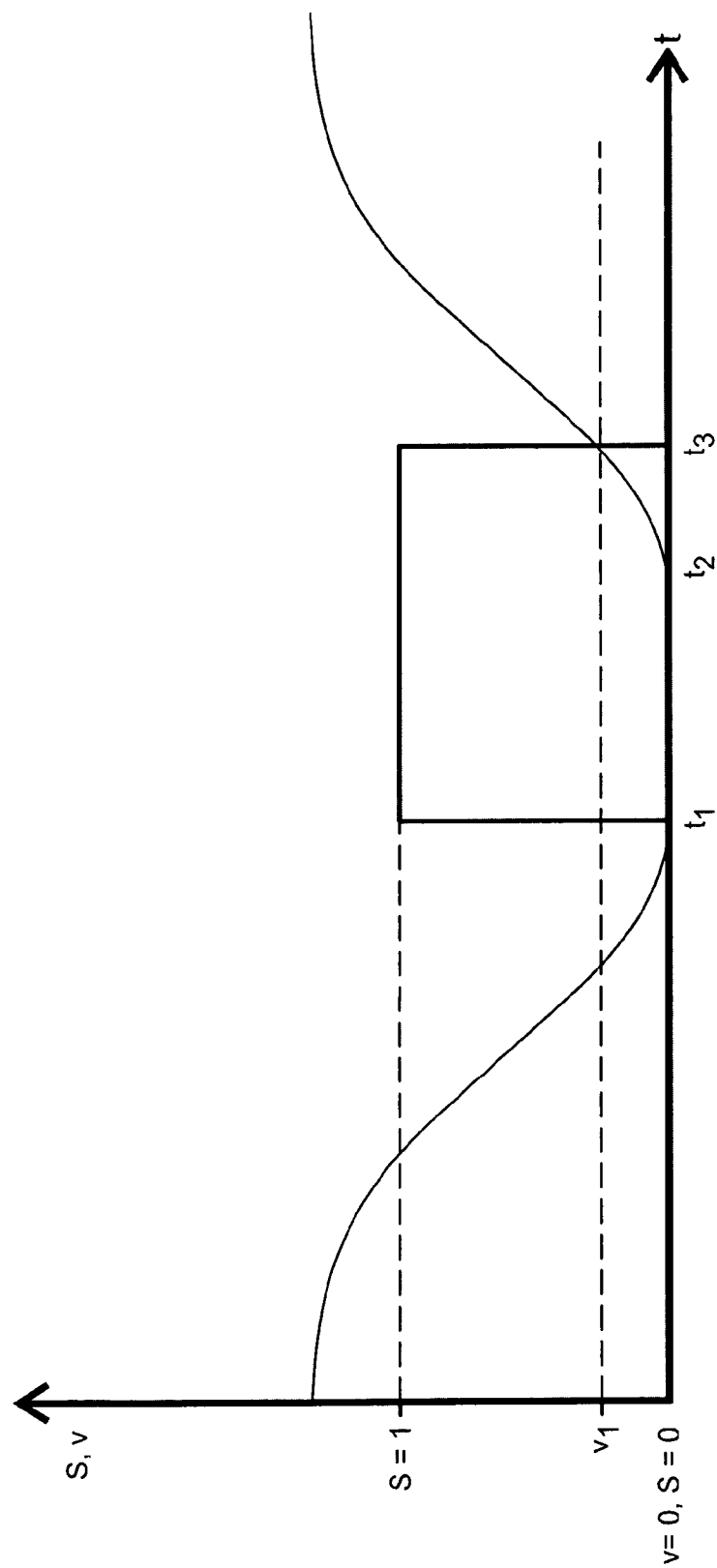
FIG. 3 is a plot of vehicle speed and driveline mode as a function of time for a portion of a drivecycle for a vehicle according to a further embodiment of the invention.

FIG. 3 shows plots of vehicle speed v and driveline state $S_a$ as a function of time during a drivecycle for a vehicle according to a still further embodiment of the invention. According to the embodiment of FIG. 3 the driveline is configured automatically to assume the second (four wheel drive) mode when the vehicle is stationary.

As shown in the plot, at time $t_1$ the vehicle speed falls to zero and the controller 40 controls the driveline 5 to assume the second mode of operation ($S_a=1$). At time $t_2$ the vehicle starts to move again (v increases from zero) and at time $t_3$ the speed exceeds a threshold value $v_1$. Once the speed exceeds $v_1$ the controller 40 controls the driveline 5 to assume the first mode of operation until the speed again falls to zero. In some embodiments the controller 40 is configured to control the vehicle to assume the two wheel drive mode of operation when the speed v exceeds around 15 kilometers per hour. Other speeds are also useful.

It is to be understood that embodiments of the present invention have the advantage that the driveline 5 is always in the second mode (four wheel drive mode) of operation when the vehicle is stationary. Thus, whenever the vehicle begins to move from a stationary condition all four wheels of the vehicle drive the vehicle. This has the advantage that a risk that the vehicle will experience wheel slip when starting from stationary may be reduced substantially.

It is to be understood that in embodiments of the invention having terrain response vehicle programs, a driver may select a terrain response program according to the environmental conditions the driver perceives to exist. However it is possible that a driver will not appreciate that a risk of wheel slip exists on a given surface and therefore attempt to move the vehicle without selecting an appropriate program.

Thus, some embodiments of the invention have the advantage the vehicle will initially attempt to move in a four wheel drive mode and not a two wheel drive mode regardless of whether the driver has selected an appropriate vehicle program. Thus, if a surface on which the vehicle has been standing is a surface requiring four wheel drive operation the vehicle will initially start to move in the four wheel drive mode regardless of the driver selected vehicle program.

An example of a situation in which embodiments of the present invention may be useful is a situation in which a vehicle parks on dry grass and the driver leaves the vehicle. Whilst the vehicle is unattended the grass may become wet, for example due to precipitation such that when the driver returns four wheel drive operation is required in order to move the vehicle. The driver may attempt to move the vehicle without running a special vehicle program appropriate to the surface condition, such as a 'grass/gravel' terrain response mode. However, when the driver attempts to move the vehicle the vehicle will start to move in the four wheel drive mode automatically, regardless of whether or not the driver has selected a special vehicle program. This results in a reduced risk of wheel slip.

Thus embodiments of the invention have the advantage that the vehicle will automatically attempt to move in the four wheel drive mode of operation and not the two wheel drive mode because the vehicle has been stationary, regardless of whether or not an appropriate driver-selected vehicle program has been selected.

It is to be understood that wheel slip can be particularly undesirable in some circumstances, for example due to damage caused to the surface over which the vehicle is attempting to move. Furthermore, a vehicle initially experiencing wheel slip in two wheel drive mode can become immobile even if four wheel drive mode is subsequently selected.

It is to be understood that in some embodiments the controller 40 may be operable to over-ride starting of the vehicle in the four wheel drive mode, for example due to a special vehicle program being selected or any other prescribed condition.

It is to be understood that other driveline configurations are also useful.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK patent application no. GB1102822.2 filed 18 Feb. 2011, the entire contents of which are expressly incorporated by reference herein.

The invention claimed is:

1. A motor vehicle having:
prime mover means;
at least first and second groups of one or more wheels; and
a driveline operable to connect the prime mover means to the first and second groups of one or more wheels such that the first group of one or more wheels and not the second group is coupled to a torque transmission path from the prime mover means when the driveline is in a first mode of operation and both the first and second groups of one or more wheels are coupled to a torque transmission path from the prime mover means when the driveline is in a second mode of operation,
the driveline including an auxiliary portion for connecting the second group to the torque transmission path from the prime mover means, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels,
the vehicle further comprising control means operable to control the first and second torque transmitting means to switch the driveline between the first and second modes of operation such that in the first mode the prop shaft is disconnected from both the torque transmission path from the prime mover means and said second group of one or more wheels,
wherein when in the first mode the vehicle is operable to control the driveline to switch from first mode to the second mode when a speed of the vehicle is less than or equal to a first prescribed non-zero threshold speed value, and
the vehicle is configured to assume the first mode when the speed rises above a second prescribed threshold speed value greater than the first prescribed threshold speed value from a value below the second prescribed threshold speed value.

2. A vehicle as claimed in claim 1 wherein the first prescribed threshold speed value is in the range of at least one selected from amongst from 1 to 50, 1 to 40, 1 to 30, 1 to 20, 1 to 15, 1 to 10, 1 to 5, 5 to 10 and 5 to 15 kilometers per hour.

3. A vehicle as claimed in claim 1 configured to assume the first mode when the speed rises above the first prescribed threshold speed value from a value below the first prescribed threshold speed value.

4. A vehicle as claimed in claim 1 wherein the first prescribed threshold speed value is substantially equal to or less than 15 kilometers per hour and the second prescribed threshold is greater than 15 kilometers per hour.

5. A vehicle as claimed in claim 1 operable to control the driveline to assume the second mode when the speed rises above a third prescribed threshold speed value from a value below the third prescribed threshold speed value.

6. A vehicle as claimed in claim 5 wherein the third threshold speed value is greater than the first threshold speed value.

7. A vehicle as claimed in claim 5 wherein the third threshold speed value is greater than the second threshold speed value.

8. A vehicle as claimed in claim 7 wherein the driveline is operable to assume the first mode when the speed falls below a fourth prescribed threshold speed value from a value above the fourth prescribed threshold speed value, the fourth prescribed threshold speed value being greater than the second prescribed threshold speed value and less than the third prescribed threshold speed value.

9. A vehicle as claimed in claim 1 wherein when the vehicle controls the driveline to assume the second mode the vehicle is operable to control the driveline to complete the transition to the second mode within a period of time the length of which is responsive to a rate of deceleration of the vehicle.

10. A vehicle as claimed in claim 9 wherein when the vehicle controls the driveline to assume the second mode the vehicle is configured to control the driveline to complete a transition to the second mode within a period of time the length of which decreases as a function of increasing rate of deceleration.

11. A vehicle as claimed in claim 1 wherein the first threshold speed value increases as a function of increasing rate of deceleration.

12. A vehicle as claimed in claim 1 wherein the first group of wheels comprises a first pair of wheels and the first mode corresponds to a two wheel drive mode of operation wherein the first pair of wheels is driven by the engine.

13. A vehicle as claimed in claim 1 wherein the second group of wheels comprises a second pair of wheels and the second mode of operation corresponds to a four wheel drive mode of operation.

14. A vehicle as claimed in claim 1 wherein the second group of wheels comprises a first, a second and a third pair of wheels and the second mode of operation corresponds to a six wheel drive mode of operation.

15. A vehicle as claimed in claim 1 wherein at least one of the first and second groups of wheels comprises a plurality of pairs of wheels.

16. A vehicle as claimed in claim 1 wherein the prime mover means comprises at least one selected from amongst an internal combustion engine and an electric machine.

17. A method of controlling a motor vehicle, comprising, providing a motor vehicle having a driveline operable to connect prime mover means of the vehicle to first and second groups of one or more wheels such that the first group of one or more wheels and not the second group is coupled to a torque transmission path from the prime mover means when the driveline is in a first mode of operation and both the first and second groups of one or more wheels are coupled to a torque transmission path from the prime mover means when the driveline is in a second mode of operation, the driveline including an auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels, the method comprising controlling the first and second torque transmitting means to switch the driveline between the first and second modes of operation whereby in the first mode the prop shaft is disconnected from both the torque transmission path from the prime mover means and said second group of one or more wheels and in the second mode the prop shaft is connected to both the torque transmission path from the prime mover means and said second group of one or more wheels, the method comprising controlling the driveline to switch from the first mode to the second mode when a speed of the vehicle is less than or equal to a first prescribed non-zero threshold speed value, and the method further comprising controlling the driveline to assume the first mode when the speed rises above a second prescribed threshold speed value greater than the first prescribed threshold speed value from a value below the second prescribed threshold speed value.

18. A system for a vehicle having a driveline comprising a prime mover, at least a pair of rear wheels, a shaft for connecting the prime mover to the rear wheels and first and second coupling means for selectively connecting the prop shaft to the prime mover and to the rear wheels, respectively, the system comprising control means configured to control operation of the first and second coupling means in one of a first mode of operation, in which the prop shaft is disconnected from both the prime mover and the rear wheels, and a second mode of operation, in which the prime mover is connected to the rear wheels by the prop shaft, the control means being arranged to cause a transition from the first mode of operation to the second mode of operation in response to a speed of the vehicle being less than or equal to a first prescribed non-zero threshold speed value, and to cause a transition from the second mode of operation to the first mode of operation in response to the speed rising above a second prescribed threshold speed value greater than the first prescribed threshold speed value from a value below the second prescribed threshold speed value.

* * * * *